US011405861B2

(12) United States Patent
Regnault et al.

(10) Patent No.: US 11,405,861 B2
(45) Date of Patent: Aug. 2, 2022

(54) NETWORK REPOSITORY FUNCTION CONTROLLER

(71) Applicant: HEWLETT PACKARD ENTERPRISE DEVELOPMENT LP, Houston, TX (US)

(72) Inventors: Charles Regnault, Grenoble (FR); David Peyrton, Grenoble (FR)

(73) Assignee: Hewlett Packard Enterprise Development LP, Houston, TX (US)

( * ) Notice: Subject to any disclaimer, the term of this patent is extended or adjusted under 35 U.S.C. 154(b) by 174 days.

(21) Appl. No.: 16/851,544

(22) Filed: Apr. 17, 2020

(65) Prior Publication Data

US 2021/0068045 A1    Mar. 4, 2021

(30) Foreign Application Priority Data

Aug. 28, 2019 (EP) .................................... 19306043

(51) Int. Cl.
| | |
|---|---|
| *H04L 41/50* | (2022.01) |
| *H04L 41/0893* | (2022.01) |
| *H04W 48/18* | (2009.01) |
| *H04W 24/02* | (2009.01) |
| *H04L 45/58* | (2022.01) |
| *H04L 41/0803* | (2022.01) |
| *H04L 43/10* | (2022.01) |

(52) U.S. Cl.
CPC ......... *H04W 48/18* (2013.01); *H04L 41/0803* (2013.01); *H04L 43/10* (2013.01); *H04L 45/58* (2013.01); *H04W 24/02* (2013.01)

(58) Field of Classification Search
None
See application file for complete search history.

(56) References Cited

U.S. PATENT DOCUMENTS

| | | | |
|---|---|---|---|
| 10,235,226 B1 | 3/2019 | Shekhar et al. | |
| 2018/0227871 A1 | 8/2018 | Singh et al. | |
| 2019/0230556 A1* | 7/2019 | Lee ....................... | H04W 60/00 |
| 2020/0177457 A1* | 6/2020 | Seenappa ............ | H04L 41/5058 |
| 2020/0296660 A1* | 9/2020 | Wang .................... | H04W 48/18 |
| 2020/0396132 A1* | 12/2020 | Wang ..................... | H04L 29/06 |
| 2021/0092639 A1* | 3/2021 | Larsson ............... | H04W 28/08 |

(Continued)

FOREIGN PATENT DOCUMENTS

WO    WO-2019034609 A1    2/2019

OTHER PUBLICATIONS

ETSI, "5G; 5G System; Network Function Repository Services; Stage 3," Technical Specification, Oct. 2018, https://www.etsi.Org/deliver/etsi_ts/129500_129599/129510/15.01.00_60/ts_129510v150100p.pdf.

(Continued)

*Primary Examiner* — Ajit Patel
(74) *Attorney, Agent, or Firm* — Hewlett Packard Enterprise Patent Department (57) ABSTRACT

Example implementations relate to registering a network function to a Network Repository Function (NRF). An NRF controller may detect a network function over a network, and responsive to the detection, may determine whether the network function is registered to the NRF. The NRF controller may register the network function to the NRF responsive to determining that the network function is not registered to the NRF.

21 Claims, 5 Drawing Sheets

(56) References Cited

U.S. PATENT DOCUMENTS

| | | | |
|---|---|---|---|
| 2021/0195506 A1* | 6/2021 | Bartolome Rodrigo | ............... H04L 67/16 |
| 2021/0235244 A1* | 7/2021 | Bartolome Rodrigo | ............... H04W 4/50 |

OTHER PUBLICATIONS

Github, "cAdvisor," retrieved online May 20, 2019, https://github.com/google/cadvisor.

Stack Overflow, "What's the Difference Between ClusterIP, NodePort and LoadBalancer Service Types in Kubernetes?" retrieved online Jul. 28, 2019, https://stackoverflow.com/questions/41509439/Whats-the-difference-between-clusterip-nodeport-and-loadbalancer-service-typers.

Taleb, T., "ELEC-E7230—Mobile Communication Systems," Sep. 30, 2018, https://mycourses.aalto.fi/pluginfile.php/794604/mod_resource/content/7/Lecture%203%20-%20SDN%20and%20NFV%2C%205G.pdf.

The Linux Foundation, "Service—Kubernetes," 2019, 37 pages, https://kubernetes.io/docs/concepts/services-networking/service/.

\* cited by examiner

NETWORK REPOSITORY FUNCTION CONTROLLER

BACKGROUND

A 5$^{th}$ generation (5G) cellular networking system includes the following components: a 5G access network (5G-AN), a 5G core network (5GC), and use equipment (UE). The 5G core network may include various virtualized network functions (NFs), including, for example, an Authentication Server Function (AUSF), Core Access and Mobility Management Function (AMF), a policy control function (PCF), and a session management function (SMF), to name a few. A 5G core network may also include an Network Repository Function (NRF), which provides for network function service registration, authorization, and discovery, and otherwise enables network functions to identity one another. Specifically, an NRF may maintain and otherwise manage the network function profile of available network function instances, allow network function instances to subscribe to, and be notified about, the registration of new network function instances at the NRF, and satisfy network function discovery requests from network function instances.

BRIEF DESCRIPTION OF THE DRAWINGS

Certain examples are described in the following detailed description and in reference to the drawings, in which.

DETAILED DESCRIPTION OF SPECIFIC EXAMPLES

As described above, a Network Repository Function (NRF) may track and/or otherwise manage the profiles of various network function instances. The NRF may include a Network Function Management Service, also referred to as an Nnrf_NFManagement service. The Network Function Management service may enable the registration, deregistration, and/or update of a network function instance profile. A network function, through the Network Function Management Service, may also subscribe to be notified of newly registered network function instances and any services associated with the network function instances. A network function may also subscribe to be notified of any changes to the profile of a registered network function.

A profile of a network function registered at an NRF may include general parameter/s of a network function instance, including how to reach the network function through a Fully Qualified Domain Name (FQDN) or Internet Protocol (IP) address. The network function profile may also include information about the contents of the services offered, or otherwise exposed, by the network function. A network function profile update may thus include any replacements, or other amendments to the parameters included in the network function profile, including any additions or deletions of the various services exposed by the network function instance.

Each network function that has registered at the NRF may contact the NRF periodically, i.e. transmit a heartbeat to the NRF, to indicate to the NRF, and thus to other subscribing network functions, that the registered network function is still active and otherwise healthy. The time interval for which the heartbeat is transmitted may be deployment-specific. An NRF that does not receive a heartbeat from a registered network function in the deployment-specific time interval may change the status of the network function to SUSPENDED and may otherwise notify other subscribing network functions of the status change.

Figure 1:
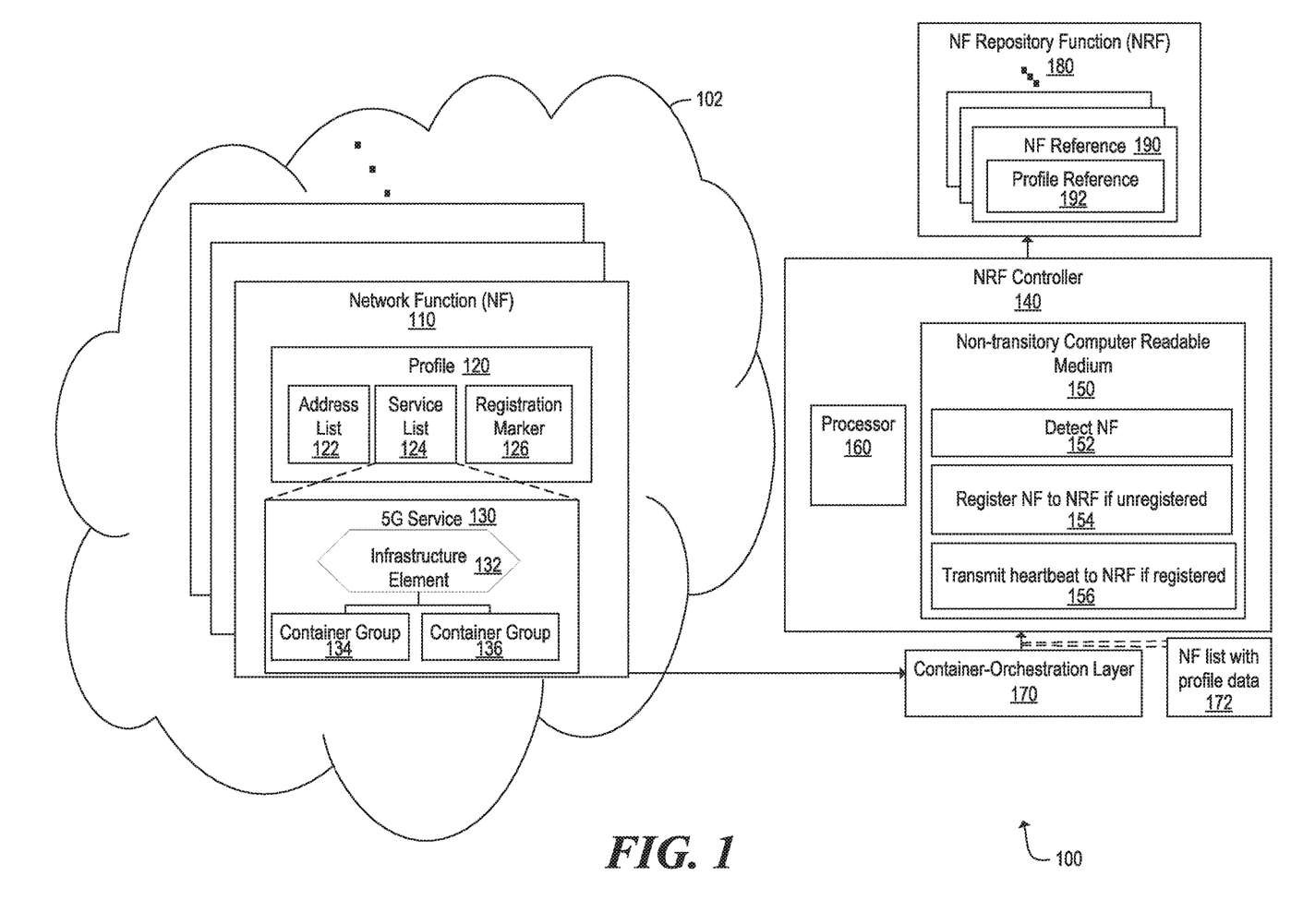
FIG. 1 is a block diagram illustrating a system for registering a network function to a Network Repository Function (NRF).

Network functions may expose services that comprise of any number of containers having resources for supporting the service/s offered by the network function. FIG. 1 is a block diagram illustrating a system 100 for registering a network function, and thus the underlying containers that make up the network function, to a Network Repository Function (NRF). Example network functions 110 are illustrated. Network function 110 may include metadata in the form of a profile 120. The profile may include an address list 122 of the network function, and specifically a list of addresses 122 to service/s offered by network function 110. An address of address list 122 may, by way of non-limiting example, be a Fully Qualified Domain Name (FQDN) or Internet Protocol (IP) address.

Profile 120 may also include a list of one or more services 124 exposed by network function 110. 5G service 130 is included as an illustrated example from the list of services 124. 5G service 130 may include any number of containers. In examples described herein, a container may be a logical entity (e.g., a file, etc.) in which blocks of data may be stored. A container may enable the virtual packaging and isolation of applications for deployment. A container may share access to an Operating System (OS) kernel without a Virtual Machine (VM). One or more containers may be grouped as a resource unit known as a container group, which may be referred to as a Pod in some instances. Resources within a container group, e.g. container group 134 and/or container group 136, may be co-located and co-scheduled, and otherwise run in a shared context. Containers of a given container group may be tightly coupled, such that the containers within container group 134 and/or container group 136 may be of a same logical host, i.e. a same physical or virtual machine. Containers of a like container group may also share an address. While two example container groups are illustrated for purposes of clarity and conciseness, a service exposed by a network function may be supported by any number of container groups having any number of containers.

An NRF container-orchestration layer 170 may be utilized for deploying, scaling, and otherwise managing container groups 134 and/or 136 across any number of environments. By way of non-limiting examples, container-orchestration layer 170 may be at least one of Docker Swarm®, Kubernetes®, Cloud Foundry® Diego, Apache® Mesos™, and the like.

A container, as well as a container's address, may be both temporary and private. A container may not be aware of its own address, and may not therefore include capabilities to register itself to an NRF, e.g. NRF 180. Rather, container groups, 134 and 136 of network function 110 may be managed and otherwise accessible via an infrastructure element, e.g. infrastructure element 132. Infrastructure element 132 may be a load balancer to load balance incoming traffic to the containers, a cluster IP service, a node port service, etc. In some example implementations, the infrastructure element may be a scheduler to schedule and/or deschedule the containers, or otherwise scale the network function to dynamically accommodate a given workload.

Infrastructure element 132 may be implemented by one or more engines which may be any combination of hardware and programming to implement the functionalities of the engine(s). In examples described herein, such combinations of hardware and programming may be implemented in a number of different ways. For example, the programming for the engines may be processor executable instructions stored on at least one non-transitory computer readable storage medium and the hardware for the engines may include at least one processing resource to execute those instructions. In some examples, the hardware may also include other electronic circuitry to at least partially implement at least one of the engine(s). In some examples, the at least one computer readable medium may store instructions that, when executed by the at least one processing resource, at least partially implement some or all of the engine(s). In such examples, a computing device may include the at least one computer readable storage medium storing the instructions and the at least one processing resource to execute the instructions. In other examples, the engine may be implemented by electronic circuitry.

In an example, infrastructure element 132 may be classified such that container groups 134 and/or 136 may be accessible via infrastructure element 132. Specifically, the address of 5G service 130, which may be the address of infrastructure element 132 may be listed at address list 122. From this address, containers associated with the infrastructure element may be accessed. Where infrastructure element 132 is a cluster IP, 5G service 130 may be exposed on a cluster-internal address, such that 5G service 130 may be reachable from within the cluster, i.e., the set of virtual machines managed by container-orchestrator layer 170, but not from outside the cluster. Where infrastructure element 132 is a node port, 5G service 130 may be exposed on each node's address and the service may be reached outside the cluster.

An NRF controller 140 associated with infrastructure element 132 may be deployed. NRF controller 140 may be a stateless container associated with infrastructure element 132. NRF controller 140 may track the address of 5G service 130 and may register network function 110 to NRF 180 on behalf of the containers supporting the service/s exposed by the network function, e.g. containers of container group 134 and/or 136.

In some examples, infrastructure element 132 and/or NRF controller 140 may each be implemented by one or more engines which may be any combination of hardware and programming to implement the functionalities of the engine (s). In examples described herein, such combinations of hardware and programming may be implemented in a number of different ways. For example, the programming for the engines may be processor executable instructions stored on at least one non-transitory computer readable storage medium, e.g. computer readable storage medium 150, and the hardware for the engines may include at least one processing resource, e.g. processor 160, to execute those instructions. In some examples, the hardware may also include other electronic circuitry to at least partially implement at least one of the engine(s). In some examples, the at least one computer readable storage medium may store instructions that, when executed by the at least one processing resource, at least partially implement some or all of the engine(s). In such examples, a computing device may include the at least one computer readable storage medium storing the instructions and the at least one processing resource to execute the instructions. In other examples, the engine may be implemented by electronic circuitry.

In examples described herein, a processing resource, e.g. processor 160, may include, for example, one processor or multiple processors included in a single computing device or distributed across multiple computing devices. As used herein, a "processor" may be at least one of a central processing unit (CPU), a semiconductor-based microprocessor, a graphics processing unit (GPU), a field-programmable gate array (FPGA) configured to retrieve and execute instructions, other electronic circuitry suitable for the retrieval and execution of instructions stored on a computer readable storage medium, or a combination thereof. In examples described herein, a processing resource may fetch, decode, and execute instructions stored on a storage medium to perform the functionalities described in relation to the instructions stored on computer readable medium 150. In other examples, the functionalities described in relation to any instructions described herein may be implemented in the form of electronic circuitry, in the form of executable instructions encoded on a computer readable storage medium, or a combination thereof.

NRF controller 140, as per instructions 152, may detect a network function, e.g. network function 110, of network 102. Specifically, NRF controller 140 may observe, or otherwise monitor, network functions 110 of network 102 through container-orchestration layer 170. In some example implementations, NRF controller 140 may observe the status of network functions 110 of network 102 through a Representational State Transfer (REST) API of container-orchestration layer 170.

NRF controller 140 may determine if the detected network function 110 is registered to NRF 180. For example, NRF controller 140 may track and otherwise store a list of network functions registered to NRF 180 as will be described in greater detail below with respect to example FIG. 2. Where NRF controller 140 detects a network function not in the stored list of network functions, NRF controller 140, as per instructions 154, may register the detected network function 110 to NRF 180.

NRF controller 140 may, for example, be "aware" of an address of infrastructure element 132, and the aggregated health of the containers behind infrastructure element 132, e.g. containers of container group 134 and/or container group 136. Specifically, container-orchestration layer 170 may pass a list of network functions and profile data 172 associated with the list of network functions to NRF controller 140. NRF controller may transmit the detected network function 110 and profile 120 of the network function 110 to NRF 180 for registration. The detected network function 110 may be registered on behalf of the containers supporting the services network function 110, including containers of container group 134 and/or container group 136.

As another example, NRF controller 140 may determine that the detected network function 110 is registered by, for example, determining that the detected network function is in the stored list of network functions. NRF controller 140 may, as per instructions 156, transmit a heartbeat of detected network function 110 to NRF 180. The heartbeat may enable NRF 180 to track the overall health of the containers supporting the exposed services of network function 110, e.g. containers of container group 134 and/or 136. Accordingly, NRF controller 140 may ensure that NRF 180 keeps an updated list of registered network functions 190 of network 102, including a reference to profile data 192 associated with the registered network functions. NRF controller 140 further ensures that NRF 180 is updated on the health status of network functions 110 of network 102.

Figure 2:
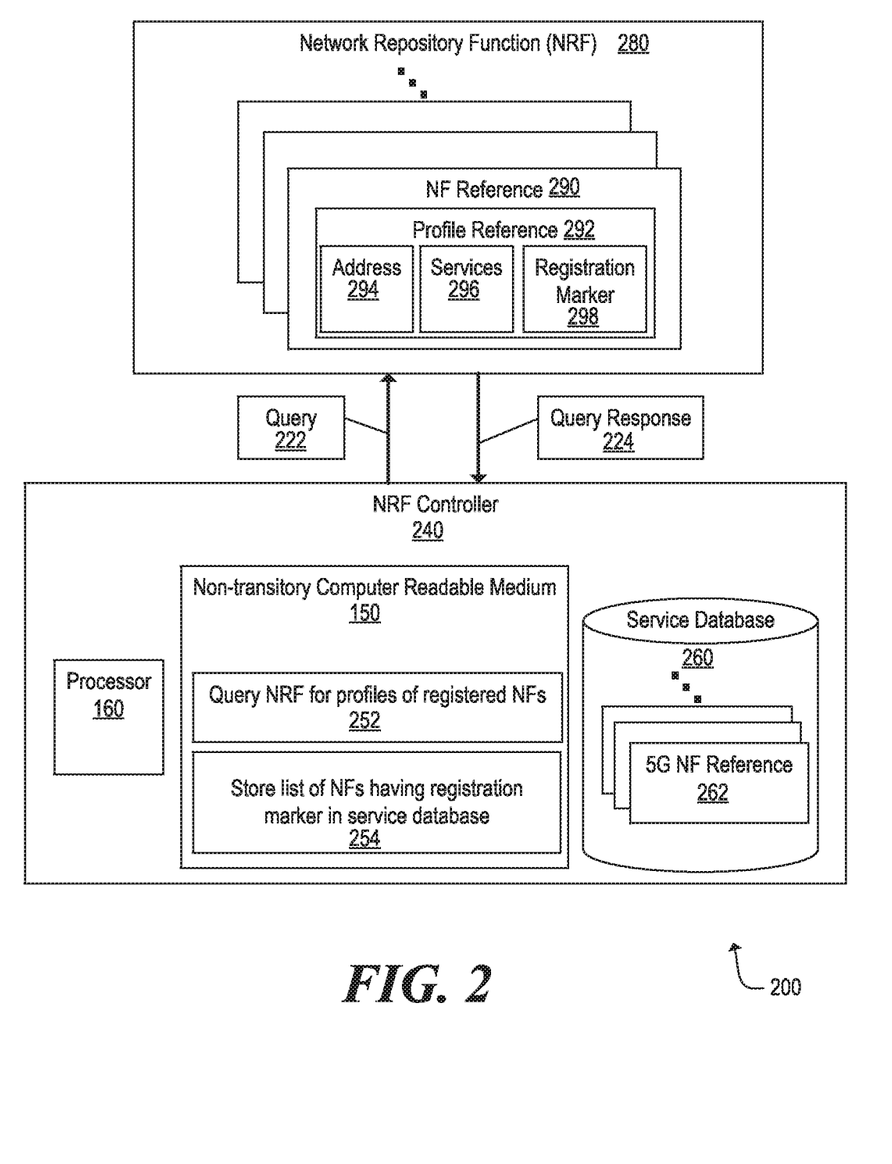
FIG. 2 is a block diagram illustrating another system for registering a network function to an NRF.

FIG. 2 is a block diagram illustrating a system 200 for registering a network function, and thus the underlying containers that make up the network function, to a Network Repository Function (NRF). NRF controller 240 may include similar components to NRF controller 140, including non-transitory computer readable medium 150 and processor 160. Like NRF controller 140, NRF controller 240 may be implemented by one or more engines which may be any combination of hardware and programming to implement the functionalities of the engine(s). And, similar to NRF controller 140 above, NRF controller 240 may be implemented by electronic circuitry, by a processing resource, e.g. processor 160, executing instructions stored at non-transitory computer readable medium 150, or any combination thereof.

NRF 280, as described herein, may include a list of network functions 290 registered to NRF 280. NRF 280 may also include associated profile information 292 of a registered network function. The profile information 292, as described above, may include any services 296 exposed by network function 290, and any number of addresses 294 of containers, and/or container groups, having resources for supporting services 296. NRF 280 may further include data indicating which network functions registered by NRF 280 include a 5G service.

Profile information 292 of network function reference 290 may further include a registration marker 298. As described above with respect to FIG. 1, NRF controller 140 may transmit a detected network function 110 and profile 120 of the network function 110 to NRF 180 for registration. The detected network function 110 may be registered on behalf of the containers supporting the services network function 110, including containers of container group 134 and/or container group 136. When transmitting a profile of a detected network function to NRF 180 for registration, NRF controller 140 may further transmit a registration marker to be included in profile 120. Turning back to FIG. 2, registration marker 298 may be included in the profile of network function 290 to indicate that it was NRF controller 240 that registered the network function to NRF 280.

As described above, NRF controller 240 may be a stateless container, or any number of stateless containers formed as a group. NRF controller 240 may be descheduled, or otherwise removed from the network for any number of reasons. In an example, NRF controller 240 may be descheduled by infrastructure element 132 of FIG. 1. NRF controller 240 may, in some examples, be stopped by container-orchestration layer 170 of FIG. 1. NRF controller 240 may also crash or otherwise terminate.

NRF controller may be restarted or otherwise deployed by infrastructure element 132 and/or container-orchestration layer 170. When NRF controller is rebooted, restarted, and/or otherwise deployed, instructions 252 may cause NRF controller 240 to transmit a query 222 to Network Repository Function (NRF) 280. Query 222 may, for example, be a request for a list of profiles 292 of network functions 290 registered to NRF 280. Responsive to the request, NRF controller 240 may receive a query response 224 from NRF 280. Query response 224 may include the list of network functions 290 and the associated profile data 292.

NRF controller 240, responsive to receiving query response 224, may filter for network functions 290 associated with a profile 292 having registration marker 298. NRF controller 240, may subsequently store the list of network functions 290 registered to NRF 280 including registration marker 298. For example, NRF controller 240 may store the network function references 262 at service database 260 of NRF controller 240. Accordingly, NRF controller 240 may rebuild the list of network functions registered by NRF controller 240 when NRF controller 240 is reactivated, redeployed, or otherwise brought back online.

While service database 260 is illustrated as local to NRF controller 240, service database 260 may, in some example implementations, be remote to NRF controller 240, and may be accessible over a network. Furthermore, while only a single service database 260 is illustrated for purposes of clarity and conciseness, any number of service databases may be utilized for storage of network function references 262 including registration marker 298.

Figure 3:
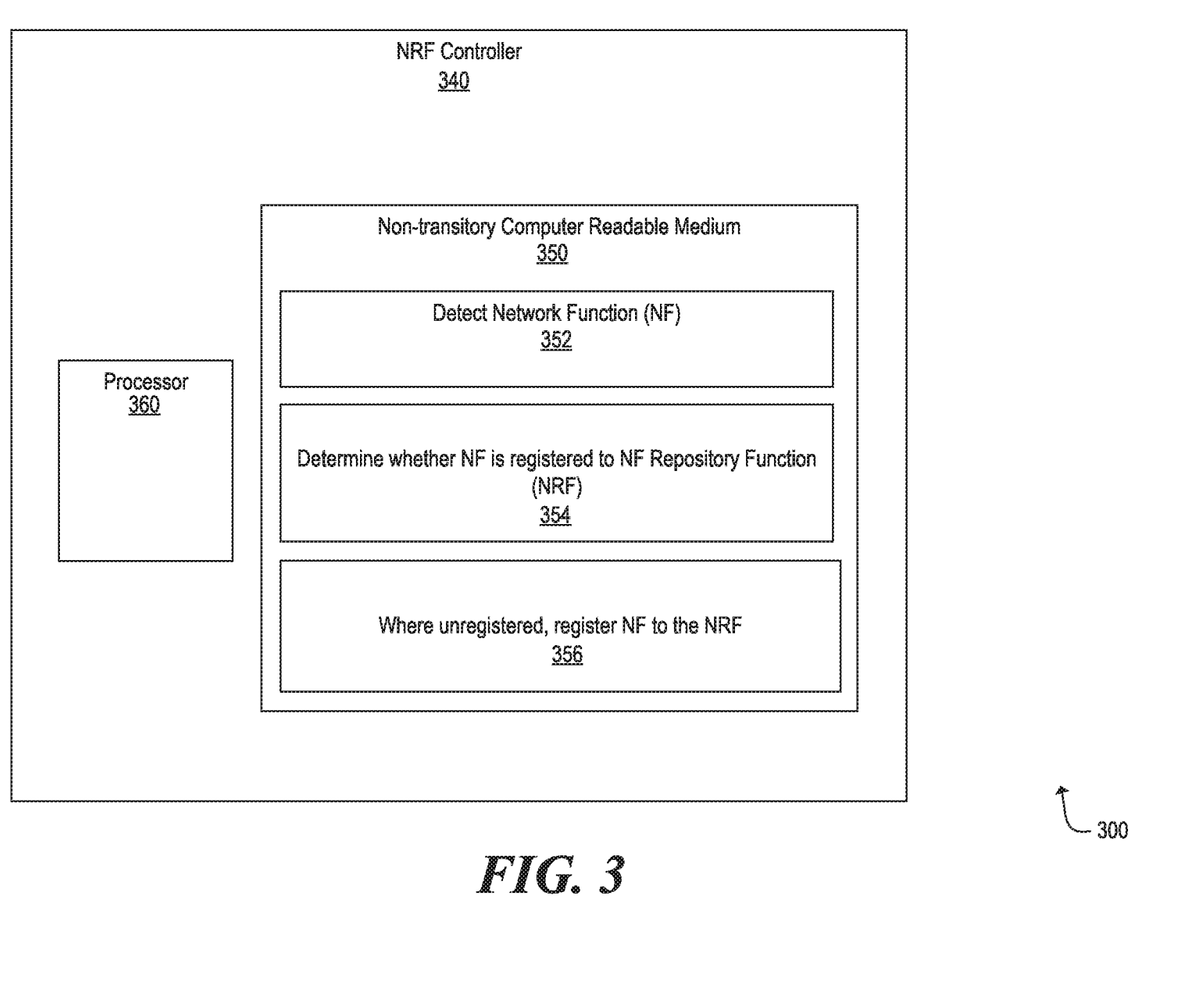
FIG. 3 is a block diagram 300 of an example Network Repository Function (NRF) controller.

FIG. 3 is a block diagram 300 of an example Network Repository Function controller 340. NRF controller 340, as described herein, may be a stateless container and may be implemented by one or more engines which may be any combination of hardware and programming to implement the functionalities of the engine(s). In examples described herein, such combinations of hardware and programming may be implemented in a number of different ways. For example, the programming for the engines may be processor executable instructions stored on at least one non-transitory computer readable storage medium, e.g. non-transitory computer readable medium 350, and the hardware for the engines may include at least one processing resource, e.g. processor 360, to execute those instructions. In some examples, the hardware may also include other electronic circuitry to at least partially implement at least one of the engine(s). In some examples, the at least one non-transitory computer readable medium may store instructions that, when executed by the at least one processing resource, at least partially implement some or all of the engine(s). In such examples, a computing device may include the at least one computer readable storage medium storing the instructions and the at least one processing resource to execute the instructions. In other examples, the engine may be implemented by electronic circuitry.

Non-transitory computer readable medium 350 may be implemented in a single device or distributed across devices. Likewise, processor 360 may represent any number of physical processors capable of executing instructions stored by computer readable medium 350.

As used herein, a "computer readable medium" may be any electronic, magnetic, optical, or other physical storage apparatus to contain or store information such as executable instructions, data, and the like. For example, any computer readable medium described herein may be any of RAM, EEPROM, volatile memory, non-volatile memory, flash memory, a storage drive (e.g., an HDD, an SSD), any type of storage disc (e.g., a compact disc, a DVD, etc.), or the like, or a combination thereof. Further, any computer readable medium described herein may be non-transitory. In examples described herein, a computer readable medium or media may be part of an article (or article of manufacture). An article or article of manufacture may refer to any manufactured single component or multiple components.

Processor 360 may be a central processing unit (CPU), graphics processing unit (GPU), microprocessor, and/or other hardware device suitable for retrieval and execution of instructions stored in computer readable medium 350. Processor 360 may fetch, decode, and execute program instructions 352-356, and/or other instructions. Similarly, processor 360 may fetch, decode, and execute program instructions 352-356. As an alternative or in addition to retrieving and executing instructions, processor 360 may include at least one electronic circuit comprising a number of electronic components for performing the functionality of instructions 352-356, and/or other instructions. Similarly, processor 360 may include at least one electronic circuit comprising a number of electronic components for performing the functionality of instructions 352-356, and/or other instructions.

Instructions 352, when executed, may detect a network function over a network, e.g. network function 110 of network 102 as illustrated in FIG. 1. For example, NRF controller 340 may monitor service resources and associated containers having resources supporting the monitored services through an orchestration layer, e.g. container-orchestration layer 170. NRF controller 340 may detect a transmission from a network function 110, and/or container-orchestration layer 170 may pass network function data over to NRF controller 140.

Instructions 354, when executed, may determine whether the network function is registered to an NRF, e.g. NRF 180 or NRF 280 of FIG. 1 or FIG. 2 respectively. Instructions 356 may register the network function to the NRF where the network function is determined to be unregistered.

Figure 4:
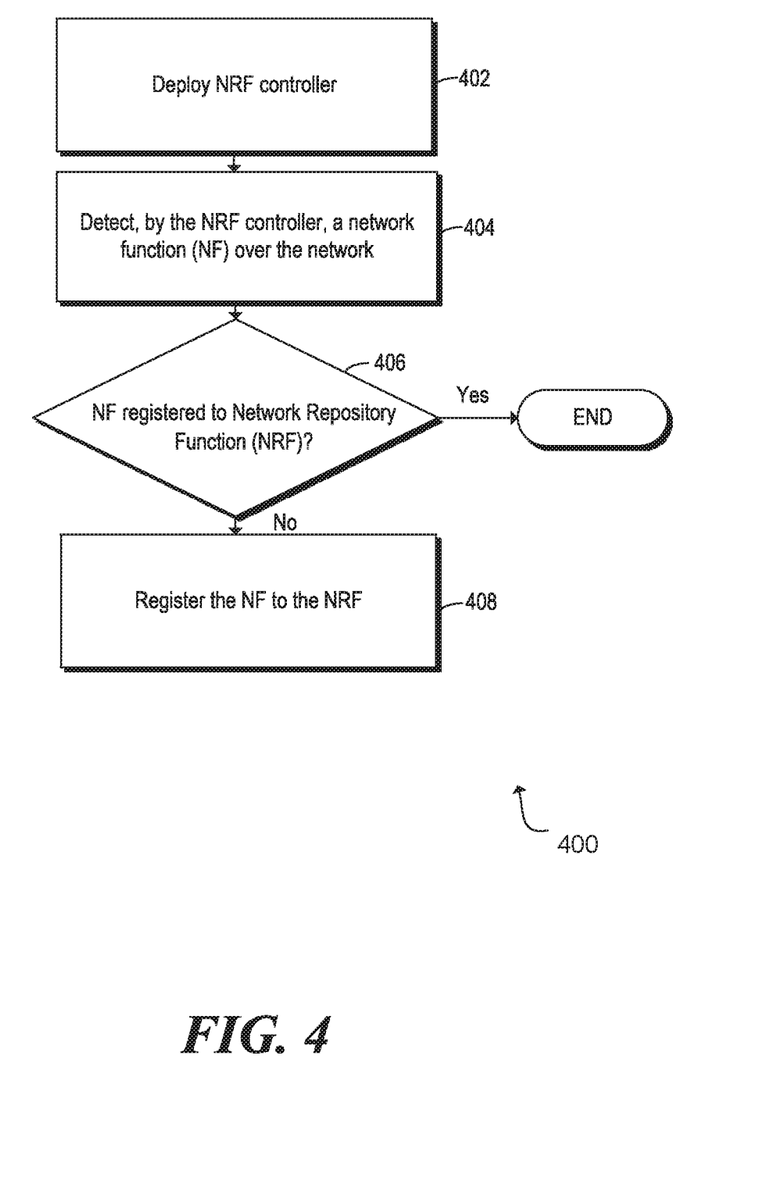
FIG. 4 is a flowchart illustrating an example method for registering a network function to an NRF.
Figure 5:
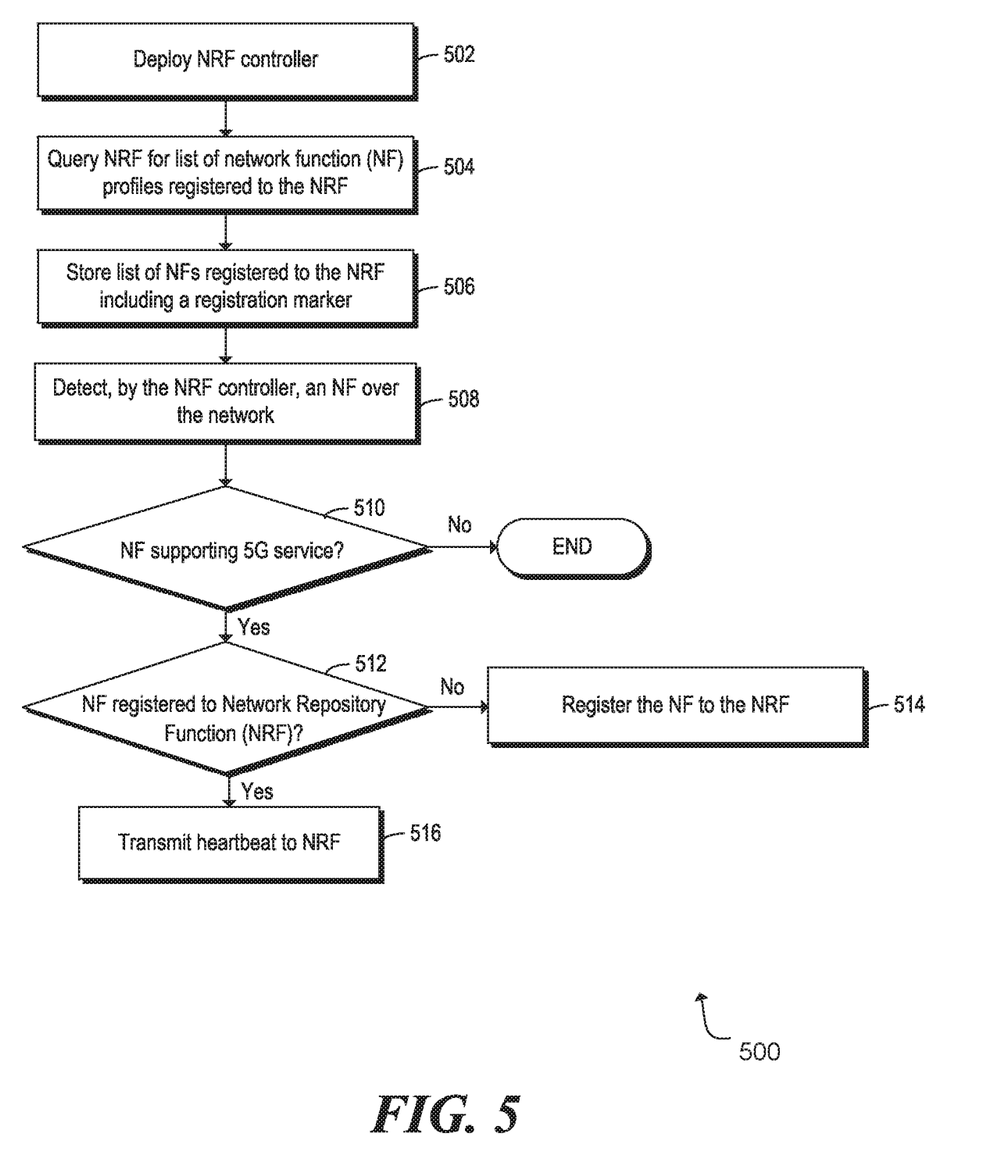
FIG. 5 is another flowchart illustrating an example method for registering a network function to an NRF.

FIG. 4 and FIG. 5 are flowcharts, 400 and 500 respectively, illustrating a method for registering a network function to a Network Repository Function (NRF). Although execution of method 400 and 500 are described below with reference to system 100, this is for explanatory purposes and other suitable components for execution of method 400 and method 500 may be utilized. Additionally, the components for executing method 400 and 500 may spread among multiple devices. Method 400 and method 500 may be implemented in the form of executable instructions stored on a computer readable storage medium and/or in the form of electronic circuitry, e.g. hardware. In some examples, steps of method 400 and method 500 may be executed substantially concurrently or in a different order than shown in FIG. 4 and FIG. 5. In some examples, method 400 and 500 may include more or less steps than are shown in FIG. 4 and FIG. 5. In some examples, some of the steps of method 400 and 500 may, at certain times, be ongoing and/or may repeat.

At block 402, an NRF controller may be deployed. In an example implementation, NRF controller may be deployed by infrastructure element 132 and/or container-orchestration layer 170 of FIG. 1. The NRF controller, may, in some examples, be deployed as a stateless container and may otherwise be managed by infrastructure element 132. An NRF controller is deployed where it is otherwise, restarted, configured, brought online, or otherwise activated within the network.

At block 404, the NRF controller may detect a network function over the network. For example, with reference to FIG. 1, NRF controller 140 may detect network function 110 over network 102. In some example implementations, network function 110 may be detected via container-orchestration layer 170 passing network function data 172 over to NRF controller 140. NRF controller 140 may, in some examples, monitor for any network function 110 "liveliness," i.e. a transmission by any network function 110 of network 102.

At block 406, it may be determined if the network function is registered to the NRF, e.g. NRF 180. Where the network function is determined to not be registered to the NRF, the network function may, at block 408, be registered to the NRF.

Turning to FIG. 5, an NRF controller may, at block 502, be deployed. As described above, the NRF controller may be deployed by infrastructure element 132 and/or container-orchestration layer 170 of FIG. 1. At block 504, the deployed NRF may query a Network Repository Function (NRF) for a list of network function profiles registered to the NRF. Specifically, when the NRF controller is rebooted, restarted, and/or otherwise deployed, the NRF controller may transmit a query to the NRF. The NRF may respond to the request by providing the NRF controller with a list of network functions and/or associated profile data.

At block 506, the NRF controller may store a list of the network functions registered to the NRF. Specifically, the NRF controller may store a list of network functions both registered to the NRF and including a registration marker. When transmitting a profile of a detected network function to the NRF for registration, the NRF controller may transmit a registration marker to be included in the profile of the registered network function. The registration marker may, in some examples, be included in the profile of the registered network function to indicate that it was a network function registered by the NRF controller. Accordingly, the NRF controller may track the list of network functions the NRF controller registered, even where the NRF controller is temporarily disabled or otherwise taken offline.

At block 508, the NRF controller may detect a network function over the network. At block 510, it may be determined whether the detected network function supports a 5G service. Specifically, it may be determined whether the network function exposes, or otherwise supports a 5G service. In another example, it may be determined whether the network function includes metadata, or any other indicator suggesting that the network function supports a 5G service. Network functions may expose services that comprise of any number of containers having resources for supporting the service/s offered by the network function, including 5G services. A 5G service may be any service supporting 5G New Radio (NR) software. 5G NR is a radio access technology for use in 5G mobile networks.

Where the network function is determined to be labeled as, or otherwise supportive of a 5G service, the NRF controller may, at block 512, determine whether the network function is registered to the NRF. Where it is determined at block 512 that the network function is not registered to the NRF, the NRF controller may, at block 514, register the network function to the NRF.

Where it is determined at block 512 that the network function is registered to the NRF, the NRF controller may, at block 516, transmit a heartbeat to the NRF, or otherwise report the health status of the network function to the NRF. Each network function that has registered at the NRF may contact the NRF periodically, i.e. through the NRF controller, to indicate to the NRF, and thus to other subscribing network functions, that the registered network function is still active and otherwise healthy. An NRF that does not receive a heartbeat from a registered network function in a deployment-specific time interval may change the status of the network function to SUSPENDED and may otherwise notify other subscribing network functions of the status change. The heartbeat may enable the NRF to track the overall health of the containers supporting the exposed services of the network function. Accordingly, the NRF controller may enable the NRF to keep an updated list of registered network functions of a network. The NRF controller further ensures that the NRF is updated on the health status of network functions of the network.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

The invention claimed is:

1. A method to be executed by a processor, the method comprising:
deploying a network repository function (NRF) controller to a network including a plurality of network functions, the NRF controller to:
monitor the plurality of network functions of the network via a container-orchestration layer associated with the NRF controller;
detect a network function of the plurality of network functions over the network via the container-orchestration layer;
responsive to the detection, determine that the network function of the plurality of network functions is not registered to an NRF via a profile of the network function stored at the NRF controller; and
responsive to determining that the network function is not registered to the NRF, register the network function of the plurality of network functions to the NRF, wherein registering the network function to the NRF includes transmitting the profile of the network function to the NRF, the profile including a service exposed by the network function.

2. The method of claim 1, further comprising determining, by the NRF controller, whether the network function supports a 5G service, wherein the network function is registered to the NRF responsive to the determination that the network function supports the 5G service.

3. The method of claim 2, wherein the network function supporting the 5G service includes a plurality of containers associated with network resources for providing a service of the network.

4. The method of claim 1, further comprising transmitting, by the NRF controller, a heartbeat of the network function to the NRF responsive to determining that the network function is registered to the NRF.

5. The method of claim 1, wherein the profile includes an address of the network function.

6. The method of claim 1, wherein the profile includes a list of services exposed by the network function.

7. The method of claim 1, wherein the profile includes a registration marker.

8. The method of claim 7, further comprising the NRF controller, responsive to deployment, to:
query the NRF for a list of profiles of network functions registered to the NRF; and
store the list of profiles of network functions registered to the NRF, wherein the list of profiles include the registration marker.

9. A network repository function (NRF) controller comprising:
a processor;
a non-transitory computer readable medium comprising instructions executable by the processor to:
monitor a plurality of network functions of the network via a container-orchestration layer associated with the NRF controller;
detect a network function of the plurality of network functions over a network via the container-orchestration layer;
responsive to the detection, determine that the network function is not registered to an NRF via a profile of the network function stored at the NRF; and
responsive to determining that the network function is not registered to the NRF, register the network function to the NRF, wherein registering the network function to the NRF includes transmitting the profile of the network function to the NRF, the profile including a service exposed by the network function.

10. The NRF controller of claim 9, wherein the profile further indicates whether the service exposed by the network function is a 5G service.

11. The NRF controller of claim 10, wherein the network function exposing the 5G service includes a plurality of containers associated with network resources for providing a service of the network.

12. The NRF controller of claim 11, wherein the plurality of containers are accessible via an infrastructure element of the registered network function.

13. The NRF controller of claim 9, wherein the profile transmitted to the NRF includes a registration marker.

14. The NRF controller of claim 13, wherein responsive to a deployment of the NRF controller, the NRF controller queries the NRF for a list of profiles of network functions registered to the NRF, and stores the list of profiles of network functions registered to the NRF including the registration marker.

15. A system comprising:
a Network Repository Function (NRF), the NRF including a list of registered network functions of a network; and
an NRF controller, the NRF controller to:
monitor a plurality of network functions of the network via a container-orchestration layer associated with the NRF controller;
detect, over the network, a network function of the plurality of network functions of the network via the container-orchestration layer;
responsive to the detection, determine that the network function is not registered to the NRF via a profile of the network function stored at the NRF; and
responsive to determining that the network function is not registered to the NRF, register the network function to the NRF, wherein registering the network function to the NRF includes transmitting the profile of the network function to the NRF, the profile including a service exposed by the network function.

16. The system of claim 15, wherein the profile further indicates that the service exposed by the network function is a 5G service, and wherein the 5G service includes a plurality of containers associated with network resources for providing the 5G service to the network.

17. The system of claim 16, wherein the 5G service includes an infrastructure element for accessing the containers of the network function associated with the 5G service.

18. The system of claim 17, wherein the infrastructure element is a load balancer, cluster IP service, or node port service.

19. The system of claim 15, wherein the profile transmitted to the NRF includes a registration marker, and wherein responsive to a deployment of the NRF controller, the NRF controller:
queries the NRF for a second list of profiles of network functions registered to the NRF; and
stores the second list of the network functions registered to the NRF including the registration marker.

20. The method of claim 1, wherein the container-orchestration layer implements a Representational State Transfer (REST) Application Programming Interface (API) to observe statuses of the plurality of network functions.

21. The method of claim 1, wherein the container-orchestration layer passes a list of network functions and profile data associated with the plurality of network functions to the NRF controller, and the method further to:
  transmit, by the NRF controller, data from the list of network functions and profile data corresponding with the network function to the NRF for registration.

\* \* \* \* \*